(12) United States Patent
Fernando

(10) Patent No.: US 11,187,621 B2
(45) Date of Patent: Nov. 30, 2021

(54) FAULT DIAGNOSIS DURING TESTING OF TURBINE UNIT

(71) Applicant: Siemens Energy Global GmbH & Co. KG, Munich (DE)

(72) Inventor: Lalith Fernando, West Bridgford (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 575 days.

(21) Appl. No.: 16/091,882

(22) PCT Filed: Apr. 21, 2017

(86) PCT No.: PCT/EP2017/059560
§ 371 (c)(1),
(2) Date: Oct. 5, 2018

(87) PCT Pub. No.: WO2017/186597
PCT Pub. Date: Nov. 2, 2017

(65) Prior Publication Data
US 2019/0120720 A1    Apr. 25, 2019

(30) Foreign Application Priority Data
Apr. 29, 2016  (EP) .................................... 16167606

(51) Int. Cl.
*G01M 15/14* (2006.01)
*G01M 15/02* (2006.01)

(52) U.S. Cl.
CPC ............ *G01M 15/14* (2013.01); *G01M 15/02* (2013.01)

(58) Field of Classification Search
CPC .............................. G01M 15/14; G01M 15/02
See application file for complete search history.

(56) References Cited

U.S. PATENT DOCUMENTS 6,606,580 B1 * 8/2003 Zedda ................ G05B 13/0265
702/182
6,687,596 B2  2/2004 Humerickhouse et al.
(Continued)

FOREIGN PATENT DOCUMENTS

CA      2865195 A1    9/2013
CN    104280243 A    1/2015
(Continued)

OTHER PUBLICATIONS

International search report and written opinion dated Jul. 10, 2017, for corresponding PCT/EP2017/059560.
(Continued)

*Primary Examiner* — Yoshihisa Ishizuka

(57) ABSTRACT

A method of fault diagnosis during testing of a turbine unit includes a) obtaining measurement data from turbine sensors and testing sensors, b) calculating at least one parameter value based on measurement data, c) determining a deviation of the measurement data and the at least one parameter value by comparing the measurement data and the at least one parameter value with predetermined reference data, and d) matching the determined deviation to a plurality of predetermined fault signatures in order to detect a fault. The plurality of predetermined fault signatures includes a first set of fault signatures and a second set of fault signatures, the first set of fault signatures corresponding to turbine sensor faults and/or testing sensor faults and assumed fault-free turbine components, the second set of fault signatures corresponding to turbine component faults and assumed fault-free turbine sensors and testing sensors.

11 Claims, 7 Drawing Sheets

(56) References Cited

U.S. PATENT DOCUMENTS

| | | | |
|---|---|---|---|
| 7,020,595 B1* | 3/2006 | Adibhatla | G05B 23/0275 703/7 |
| 2005/0209767 A1* | 9/2005 | Kim | G05B 23/024 701/100 |
| 2007/0124113 A1* | 5/2007 | Foslien | G05B 23/024 702/185 |
| 2010/0138132 A1 | 6/2010 | Apps et al. | |
| 2013/0259088 A1 | 10/2013 | Bellis et al. | |
| 2013/0259089 A1 | 10/2013 | Nakazato et al. | |
| 2015/0241308 A1 | 8/2015 | Pandey et al. | |
| 2015/0300920 A1 | 10/2015 | DeAscanis et al. | |

FOREIGN PATENT DOCUMENTS

| | | |
|---|---|---|
| CN | 104512554 A | 4/2015 |
| CN | 104968920 A | 10/2015 |
| EP | 1953454 A1 | 8/2008 |
| EP | 2469041 A1 | 6/2012 |
| EP | 2660575 A2 | 11/2013 |
| JP | H09145553 A | 6/1997 |
| JP | H09318496 A | 12/1997 |
| JP | 2003176726 A | 6/2003 |
| JP | 2004150439 A | 5/2004 |
| JP | 2012112247 A | 6/2012 |
| JP | 2014149840 A | 8/2014 |
| KR | 20130006505 A | 1/2013 |
| KR | 20150056818 A | 5/2015 |
| KR | 20150114559 A | 10/2015 |

OTHER PUBLICATIONS

Zhou, Jian et al, "Model-based Sensor Fault Detection and Isolation in Gas Turbine", Proceedings of the 31st Chinese Control Conference, Jul. 25-27, 2012, pp. 5215-5218, Hefei CN, IEEE, XP032289291, ISBN 978-1-4673-2581-3.

* cited by examiner

FIG 2

$$\begin{bmatrix} \frac{dZ1}{dX1} & \frac{dZ1}{dX2} & \text{----} & \text{---} & 1 & 0 & 0 & 0 \\ \frac{dZ2}{dX1} & \frac{dZ2}{dX2} & \text{----} & \text{---} & 0 & 1 & 0 & 0 \\ \frac{dZ3}{dX1} & \frac{dZ3}{dX2} & \text{----} & \text{---} & 0 & 0 & 1 & 0 \\ \text{Matrix} & [H] & & & 0 & 0 & 0 & 1 \\ 1 & 0 & 0 & \text{---} & \frac{dX1}{dZ1} & \frac{dX1}{dZ2} & \text{----} & \text{---} \\ 0 & 1 & 0 & \text{---} & \frac{dX2}{dZ1} & \frac{dX2}{dZ2} & \text{----} & \text{---} \\ 0 & 0 & 1 & 0 & \frac{dX3}{dZ1} & \frac{dX3}{dZ2} & \text{----} & \text{---} \\ 0 & 0 & 0 & 1 & \text{Matrix} & [G] & & \end{bmatrix}$$

Left labels: dZ1, dZ2, dZ3, dX1, dX2, dX3, dX4
Right labels: dX1, dX2, dX3, dZ1, dZ2, dZ3

FIG 3

$$\begin{bmatrix} \frac{dZ1}{dX1} & \frac{dZ1}{dX2} & \text{----} & \text{---} & 1 & 0 & 0 & \text{---} \\ \frac{dZ2}{dX1} & \frac{dZ2}{dX2} & \text{----} & \text{---} & 0 & 1 & 0 & \text{---} \\ \frac{dZ3}{dX1} & \frac{dZ3}{dX2} & \text{----} & \text{---} & 0 & 0 & 1 & \\ \text{---} & \text{---} & & \text{---} & & & & \\ \frac{dZ1}{dZ1} & \frac{dZ1}{dZ2} & \frac{dZ1}{dZ3} & & \frac{dX1}{dZ1} & \frac{dX1}{dZ2} & \text{---} & \\ \frac{dZ2}{dZ1} & 1 & \frac{dZ1}{dZ3} & \text{---} & \frac{dX2}{dZ1} & \frac{dX2}{dZ2} & \text{----} & \\ \frac{dZ3}{dX1} & \frac{dZ3}{dZ2} & 1 & \text{---} & \frac{dX3}{dZ1} & \frac{dX3}{dZ2} & \text{----} & \end{bmatrix}$$

Left labels: dZ1, dZ2, dZ3, dX1, dX2, dX3, dX4
Right labels: dX1, dX2, dX3, dZ1, dZ2, dZ3, dZ4

FAULT DIAGNOSIS DURING TESTING OF TURBINE UNIT

CROSS REFERENCE TO RELATED APPLICATIONS

This application is the US National Stage of International Application No. PCT/EP2017/059560 filed Apr. 21, 2017, and claims the benefit thereof. The International Application claims the benefit of European Application No. EP16167606 filed Apr. 29, 2016. All of the applications are incorporated by reference herein in their entirety.

FIELD OF INVENTION

The present invention relates to the field of turbine testing, in particular to methods of fault diagnosis during testing of a turbine unit in a turbine testing system. Furthermore, the present invention relates to a corresponding system for testing a turbine unit, and a corresponding computer program and computer program product.

ART BACKGROUND

After manufacturing and before shipping a turbine unit, such as a gas turbine engine, the turbine unit is carefully tested in order to assure that no defective or faulty engines are delivered to the customers. Such testing is expensive with regard to both time and fuel.

Sometimes faults in the testing equipment may erroneously be considered to imply that the turbine unit being tested is defective. Furthermore, some test equipment faults and engine faults may be immediately rectified by the testing personnel, such that the testing may be completed upon rectification, while other faults need closer inspection by experts.

Present concepts of performing fault diagnosis during testing are either very complex or incapable of providing the necessary performance. Various attempts have been made to use concepts, theories and methods are being used (very basic to highly complex aimed at aircraft industry) under the umbrella of turbine diagnostics. These are mainly based on running nominal engine model, on-line and adapting its component characteristics to current engine, using Newton-Raphson iterative processes and generally requires updating Jacobian derivative matrix with each iteration (hence they are time consuming and expensive). Furthermore, they address the mathematical inverse problem and hence require clear bias of measurements for success to reach a solution and quantify the uncertainties in them. These methods run into difficulties, when applied in real situations due to one or more of the following: 1) Uncertainties of instrument and not knowing them well enough to weight and balance against them; 2) Separate diagnostics of instrument and engine component faults, hence corrupting the data of one by the other type; 3) Convergence issues (due to use of real measured data with uncertainties); 4) Insufficient number of measurements to produce unique solutions; 5) Equation sometimes becoming singular for the information provided (with instrument biases etc.); and 6) Smearing effects, giving false residual faults with main fault.

The fault in instruments and engine components should not be dealt in isolation as they could corrupt each other's input data. To solve this issue, further complexity is added to deal with instrument faults using the same data. These methods and their published knowledge are mainly highly theoretical (with some attempts of validation). Hence, when there are double faults (with measurement faults), application of these methods is impossible.

Accordingly, there is a need for a simple and effective way of diagnosing faults during testing of turbine units, in particular one that is capable of distinguishing faults that may be immediately rectified and faults that need further inspection or repair of the turbine unit.

SUMMARY OF THE INVENTION

This need may be met by the subject matter according to the independent claims. Advantageous embodiments of the present invention are described by the dependent claims.

According to a first aspect of the invention, there is provided a method of fault diagnosis during testing of a turbine unit in a turbine testing system, the turbine unit comprising a plurality of turbine components and turbine sensors, the turbine testing system comprising a plurality of testing sensors. The method comprises (a) obtaining measurement data from the turbine sensors and the testing sensors, (b) calculating at least one parameter value based on the measurement data, (c) determining a deviation of the measurement data and the at least one parameter value by comparing the measurement data and the at least one parameter value with predetermined reference data, and (d) matching the determined deviation to a plurality of predetermined fault signatures in order to detect a fault, wherein the plurality of predetermined fault signatures comprises a first set of fault signatures and a second set of fault signatures, the first set of fault signatures corresponding to turbine sensor faults and/or testing sensor faults and assumed fault-free turbine components, the second set of fault signatures corresponding to turbine component faults and assumed fault-free turbine sensors and testing sensors.

This aspect of the invention is based on the idea that on the one hand, the assumption of a turbine unit with fault-free turbine components is used to determine a fault in turbine and/or testing sensors a fault-free turbine unit, and on the other hand, the assumption of fault-free turbine and testing sensors is used to determine a fault in a turbine component. In other words, by using the first and second sets of fault signatures, the method is capable of determining whether a certain deviation in measurement data and the at least one parameter value relative to the predetermined data is caused by a sensor fault or a turbine fault. Thereby, the method is capable of differentiating between faults that can easily be remedied by testing personnel (such as replacement of a defective sensor) and faults that require further inspection of the turbine unit. In the first case, the testing procedure may be resumed or continued after the fault has been remedied. In the second case, the testing procedure cannot be continued until after inspection and rectification of the turbine unit.

In the present context, the term "measurement data" may in particular denote series of measurement values output by each of the sensors.

In the present context, the term "parameter value" may in particular denote a quantity obtained by applying a thermodynamic relation to at least a part of the measurement data.

In the present context, the term "reference data" may in particular denote historical data (measurement data as well as parameter values) obtained during testing of similar turbine units in similar testing systems.

In the present context, the term "fault signature" may in particular denote a set of deviation values between certain measurement data and parameter values and the predetermined reference data corresponding to a particular fault.

According to an embodiment of the invention, the step of matching the determined deviation to a plurality of predetermined fault signatures comprises generating an ordered list of faults in dependency of a degree of matching between the determined deviation and each respective fault signature.

In other words, a degree of matching is determined for the deviation and each fault signature, and a list of faults is generated in which the various faults are ordered in accordance with the corresponding degree of matching.

According to a further embodiment of the invention, the step of matching the determined deviation to a plurality of predetermined fault signatures comprises a single fault matching stage based on mean values of the predetermined reference data.

In this embodiment, a single fault stage is applied which determines a degree of matching between the determined deviation (relative to mean values of the reference data) and each single fault signature. In other words, in this embodiment it is established whether the deviation is (or can be assumed to be) caused by a single fault, such as a single defective sensor.

According to a further embodiment of the invention, the step of matching the determined deviation to a plurality of predetermined fault signatures comprises a double fault matching stage based on mean values of the predetermined reference data and weighted pairs of fault signatures.

In this embodiment, a double fault stage is applied which determines a degree of matching between the determined deviation (relative to mean values of the reference data) and weighted pairs of the fault signatures. In other words, in this embodiment it is established whether the deviation is (or can be assumed to be) caused by two faults, i.e. a double fault, such as two defective sensors.

According to a further embodiment of the invention, the method further comprises determining a probability of occurrence for a plurality of candidate faults and generating a list of the candidate faults in accordance with the determined probabilities.

In other words, according to this embodiment a number of candidate faults, i.e. possible faults in view of the matching, are ordered in a list in accordance with respective probabilities of occurrence.

According to a further embodiment of the invention, the method further comprises selecting at least one of the candidate faults as an occurring fault based on the list of candidate faults.

In this embodiment, one of the candidate faults (including double faults), e.g. the candidate fault with the highest probability, is selected as the fault.

According to a further embodiment of the invention, the method further comprises outputting information identifying a fault and/or a corresponding source of fault.

By outputting information on the fault and/or the corresponding source (e.g. a defective component), the testing personnel can easily and immediately decide how to proceed.

According to a further embodiment of the invention, the method further comprises (a) stopping the testing of the turbine unit, and (b) based on the determined fault, determine whether the fault can be remedied by replacing one or more testing sensors.

In this embodiment, the testing personnel may receive information on how to proceed, e.g. to replace one or more testing sensors and immediately resume the testing procedure or to break off the testing procedure and send the turbine unit to further inspection and/or repair by specialists.

According to a second aspect of the invention, there is provided a system for testing a turbine unit. The described system comprises (a) a test bed for receiving the turbine unit to be tested, (b) a plurality of system sensors for sensing physical quantities relating to operation of the turbine unit during testing, and (c) a controller adapted to control a test operation of the turbine unit, wherein the controller is further adapted to perform fault diagnosis during the test operation by using the method according to the first aspect or any of the embodiments described above.

This aspect of the invention is a system for testing turbine units, the system incorporating a controller capable of performing the method according to the first aspect. Thus, the system according to this aspect allows efficient testing of turbine units.

According to a third aspect of the invention, there is provided a computer program comprising computer executable instructions, which, when performed by a processor of a computer, are adapted to cause the computer to perform the method according to the first aspect and/or any of the above embodiments.

According to a fourth aspect of the invention, there is provided a computer program product comprising a computer readable data carrier loaded with a computer program according to the third aspect.

The present invention as exemplified by the above aspects and embodiments allow early detection of faults (during testing of turbine units, e.g. only a few minutes into the performance test runs) in instruments (sensors) and engine components such that fuel and labour wastage due to unsuccessful completion of a 4 to 5 hour test or performing an erroneous test can be prevented. With the present invention, the fault diagnosis is performed during the testing, i.e. online, such that subsequent offline analysis of test data is not needed to reach a decision on how to proceed. The fault diagnostics combined with online monitoring of full and part load performance, and combustor temperature distributions will greatly improve the test engineers' assessment of the situation and provide a solid basis for making decisions, especially when backup support is not available. In this regard, diagnostics and monitoring mentioned here mainly refer to thermodynamic parameters.

In some cases, instruments faults (if known) may be immediately rectified by test staff (during day or night), whereupon they may continue to complete the test successfully. Therefore, the waiting time of the test staff, until an off line investigation (by an expert) can be conducted and the faults can be identified, is eliminated.

The method according to the present invention uses minimal resources to match multiple data points quickly and accurately. Good qualitative precision is sufficient for online diagnostics for the initial trigger points, in order to aid the test engineers and the non-expert analysis.

Finally, the methods may also aid borescope inspections and the process of engine restoration promptly back to a healthy state by providing proper identification of a source of fault, thus greatly improving and speeding up the rectification process and enabling to pass-off the engine in its first re-test. Long term engine component changes and instrumentation issues may be identified to support and aid future decisions in design changes and rectifications. Furthermore, supplementary information and data to aid adaptation of engine models (e.g. for engine population changes) to current engine population (as fault/deviations are measured and matched against current population) can be provided. When the engine is passed-off, a datum for site monitoring from the point of commissioning may be provided.

Summarizing, the present invention provides at least the following advantages: 1) Ability to diagnose engine and instrument faults simultaneously. 2) Balance well with real existing instrument uncertainties. 3) Capability to cope, if needed, with fewer measurements than number of engine health state variables. 4) Robust & reliable—e.g. no convergence issues. 5) Effective for the objective without under or over specification, hence economical and efficient. 6) Tuned well with production engine test process; i.e. making use of as much information provided by it (to suit operational test conditions). 7) Optimum workable engineering solution. 8) Flexible to be supplementary as well as complementary to other diagnostic methods.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION OF THE DRAWING

FIG. 2 shows a matrix equation used in a method according to an embodiment of the present invention.
FIG. 3 shows a matrix equation used in a method according to an embodiment of the present invention.

DETAILED DESCRIPTION

Figure 1:
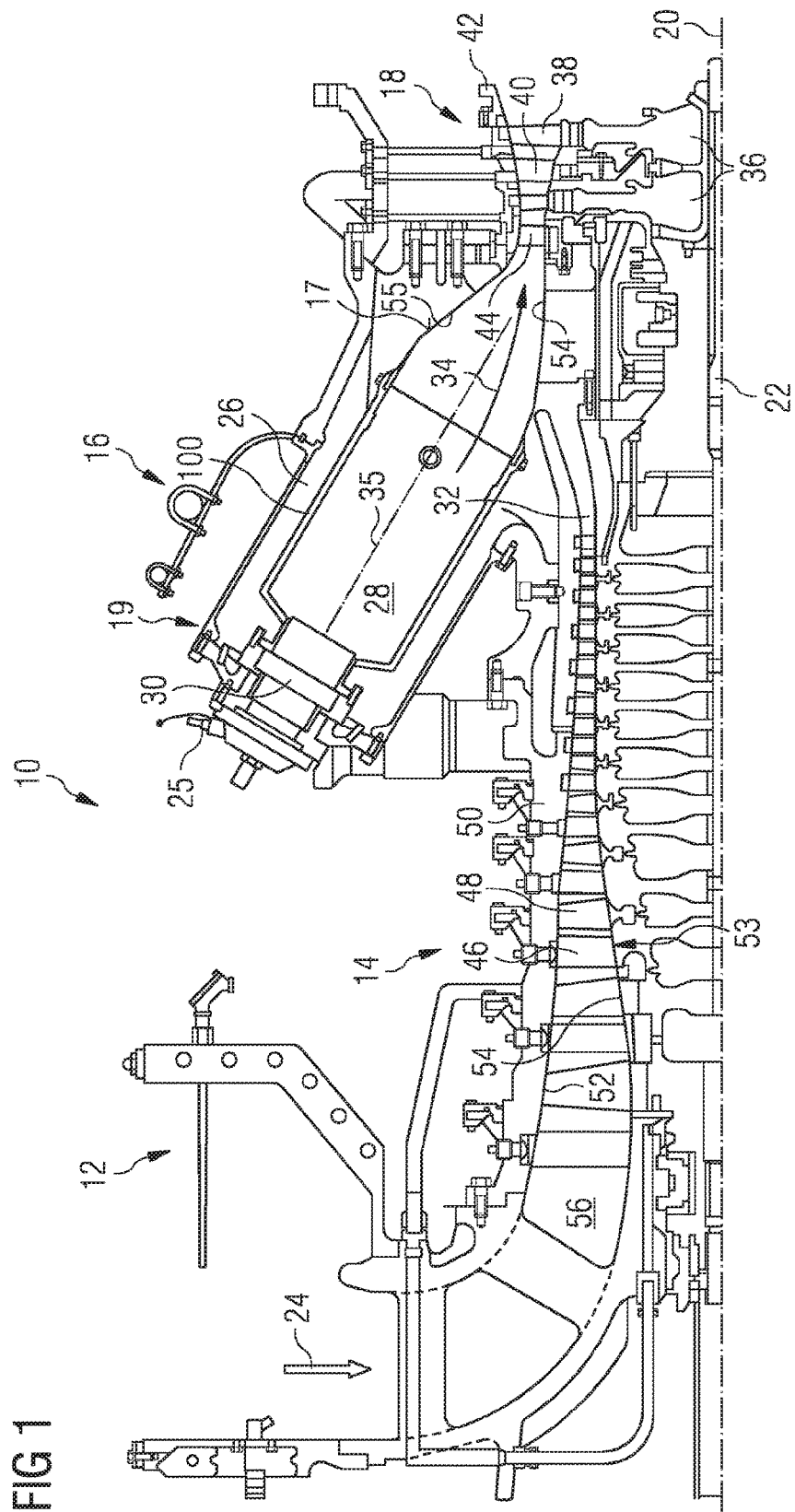
FIG. 1 shows part of a turbine engine in a sectional view.

The illustration in the drawing is schematic. It is noted that in different figures, similar or identical elements are provided with the same reference numerals or with reference numerals which differ only within the first digit.

FIG. 1 shows an example of a gas turbine engine 10 in a sectional view. The gas turbine engine 10 comprises, in flow series, an inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets forms an annulus for channelling the combustion gases to the turbine 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

The present invention, as described in more detail in the following, provides methods for fault diagnosis during (and after) testing of a turbine engine, such as the gas turbine engine 10 shown in FIG. 1 and described above, and similar gas turbine engines.

The method of the present invention has been successfully tested and may aid and ease day to day engine pass-off processes. The method has shown to be robust and less risky (for production engine tests) and also computationally less demanding as other methods.

The diagnostic process is generally divided into two stages and is designed as per required objectives of those stages. The two stage process uses a practical/flexible GPA (Gas Path Analysis) based method with the help of infusion of historical test data statistics to diagnose engine component and instrument faults simultaneously.

The method effectively uses three observers as below and their relative deviations to monitor the engine component health/deviations and integrity of measurements. i) Predictions of engine model (at defined loads)—defines measurement sensitivities to component faults; ii) Thermodynamic relationships of Energy/thermal balance in gas path for the calculation of engine component parameters—defines engine sensitivities to measurement faults; iii) Current engine population statistics—defines expected/datum This two stage online and offline diagnostic technique provides provisions for online diagnostics for expert users as well as in the form of simple instructions for non-expert users, to accommodate day time as well as night test shift.

More specifically, the process is conducted in two stages: 2a). Online diagnostic; 2b). Offline diagnostic The following categories of diagnosis are performed (online or offline):

a). Detection: It is detected, when there is a fault and possibly next stages are triggered. Although it can be done online or offline, online detection establishes the significance, hence allows an operator to assess whether to discontinue the test due to safety or in order to save fuel.

b). Isolation: The location of a fault is established. First it is determined whether there is a single or multiple faults (in instruments and/or components) and then the location of specific hardware is determined.

c). Identification: Here the cause of the fault(s) that changed the component health parameters (e.g. fouling, foreign object damage (FOD), erosion etc.) or the instrument fault that changed measurement (e.g. immersion depth, incorrect type of thermocouples, etc.) is determined and the significance of the fault(s) is estimated, possibly by weighing magnitude of the fault(s) etc.

Offline analysis may also (as per circumstances) be performed to establish whether the faults are engine or test specific or more long term (e.g. due to design or manufacturing or test equipment change).

Concept of online diagnostics:

The instruments are usually used as sensors (observers) to monitor the state of an engine (in independent component parameter vector space). The success of this depends on having fault free instruments or knowing their uncertainties/biases in order to take them into account. However, in gas turbine applications the instruments can be less reliable than the engine itself and they can often be faulty.

Therefore, the concept is based on the fact that hypothetically, an engine with fault free components could be sensors (observers) to monitor the state of instruments (in measurement vector space). Hence, in mathematical terms, the partial derivatives of fault free instruments and engine components could be formed and combined to accommodate faulty situations of both engine components and instruments. Based on this concept, methods/equations available to GPA are mathematically manipulated as below:

$$\delta F = \frac{\delta F}{\delta C} * \delta C + \frac{\delta F}{\delta I} * \delta I$$

Here, $\delta F$ denotes total change due to instrumentation and engine component fault, $\delta C$ denotes change due to engine component fault (when instruments are without faults), and $\delta I$ denotes change due to instrument fault (when engine components are without faults).

Physical problems in engines result in negative deviations in their components health parameters. These changes are sensed via measurements that can be used to calculate them. Therefore, engine characteristics/status are defined by these parameters. Hence, measured parameters are functions of these component parameters, such as:

$$Z=f(X) \qquad (a)$$

Here, Z denotes sensors (observers) that are instruments (in component vector space).

In this case, component parameters are independent parameters of the equation, and measurements done by instruments are used to sense the health of these components. To do this, it is assumed that instruments are fault free.

Now, in real life, the sensors (Z) (under that assumption of fault free instruments) are used to monitor changes/status of some components (X). Hypothetically, this is true for vice versa as well. That is, if hardware components, in this case gas turbine components, are fault free, they can be used as sensors to monitor the health of instruments.

Then the above equation can be written as:

$$X=g(Z) \qquad (b)$$

Here, X denotes sensors (observers) that are engine components (in instrument vector space).

Both above equations (a) and (b) can be linearized using Taylor series expansion as follows:

$$dZ=H*dX \qquad (a1)$$

$$dX=G*dZ \qquad (b1)$$

In equation (a1), a matrix H (component coefficient matrix) of (m, n) dimensions is formed by using an engine model, where a hypothetical engine is represented by component characteristics, such as compressor and turbine maps etc.

The matrix G (instrument coefficient matrix) of equation (b1) is obtained by applying fault perturbations to thermodynamic equations, used in the test to calculate engine component parameters, etc. Here, thermodynamic relationships, calculating component parameters, are used to obtain these signatures. This would give some form of analytical redundancy to enhance the diagnostics, because the model and these relationships uses slightly different relationships. Hence, the parameter deviations (e.g. due to a fault) would follow different routes.

As the pass-off guarantees are normally set to full load point, the turbine engine under test is first accelerated to full load point to obtain its first data points. Therefore, the above signatures are created for full load and ISO conditions. These signatures are used to detect and isolate fault(s) during production engine tests.

Equations (a1) and (b1) can be written in matrix formation as follows:

$$[dZ]=[H] \cdot [dX]$$

$$[dX]=[G] \cdot [dZ]$$

Here, the dimension of Z is m and the dimension of X is n.

Combining the above two equations results in the matrix equation shown in FIG. 2.

The data calculated from measurements, using thermodynamic relations, are first ISO corrected and then rated to the power setting (e.g. Fixed Power or Fixed Turbine Inlet Temperature, etc.). This process causes changes (because small deviations are interpolated to fixed rated values) in the left bottom corner of the matrix of FIG. 2, so that it is neither unitary nor diagonal any more. The resulting matrix is shown in FIG. 3.

The derivatives of the matrix of FIG. 3 can then be used to separate the fault signatures of measurements (Z) and engine components (X).

1. Online Diagnostics (Stage 1)

The fault diagnostic process is triggered, when the engine under test has reached the full load range and is stable.

1.1 Single Fault Matching

1st iteration: The deviation of each parameter is calculated based on the datum of current engine population mean (reference data). The deviations are then matched against each individual fault signature vector (direction and magnitude) by using a two-way optimisation process. The matched faults are then arranged in order of the residuals (e.g. from smallest to largest residual).

Figure 4:
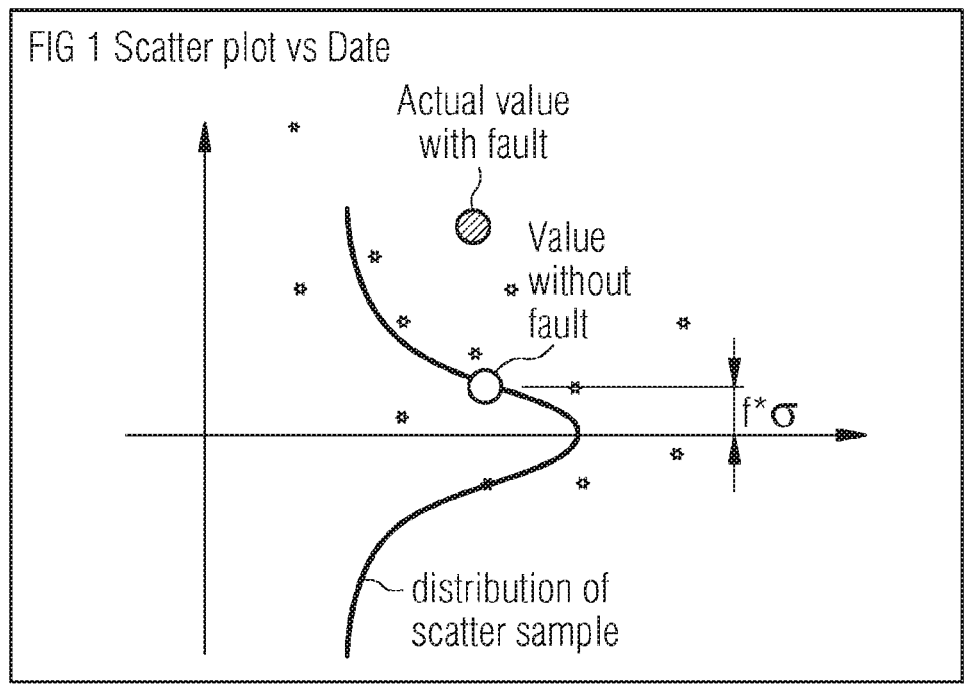
FIG. 4 shows a scatter plot vs. date in accordance with an embodiment of the invention.

2nd iteration: The first few matches are then further optimized as follows. If the engine is running within the operational engine statistics, but away from their population means (due to engine to engine variability), this could not constitute a fault. Hence, this should be considered and accommodated, when calculating the deviations (deltas) of parameters and assigning a fault to them. Constrain the expected operation point in population by a factor f of +/−2 standard deviations. Gradually increasing this factor f in steps of 0.1 (or set f to a fixed value), starting initially from 0 (see FIG. 4), the operating point is moved away from mean. At each step, the residual is optimized/minimised (using an optimization algorithm) to bring it further down, possibly to a pre-determined value. This pre-determined value and how far the factor f can be increased (keeping f<1) before the occurrence of "no fault", need to be obtained through other means (e.g. experience and historical data).

A fault having its corresponding fault free operating point closer to mean (i.e. a smaller value of the factor f), has a higher probability of occurrence. Hence, this factor can be related to the probability of occurrence for a particular fault and used to present fault scenarios in descending order of probability. At this point, other diagnostic elements, for example, tramline, turbine exit temperature distribution, etc. may be bundled to further adjust the probabilities.

Figure 5:
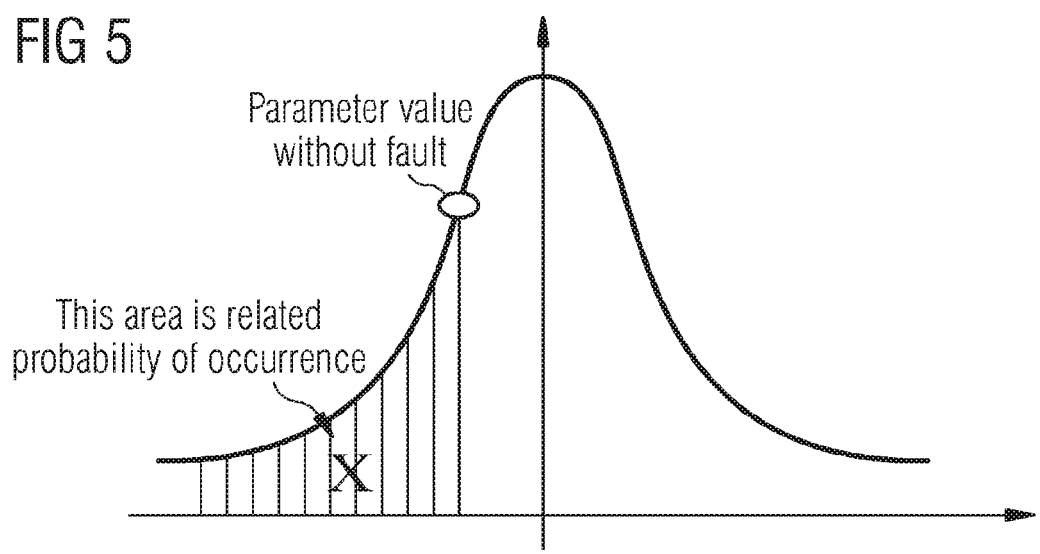
FIG. 5 shows another representation of the plot of FIG. 4, indicating probability of occurrence.
Figure 11:
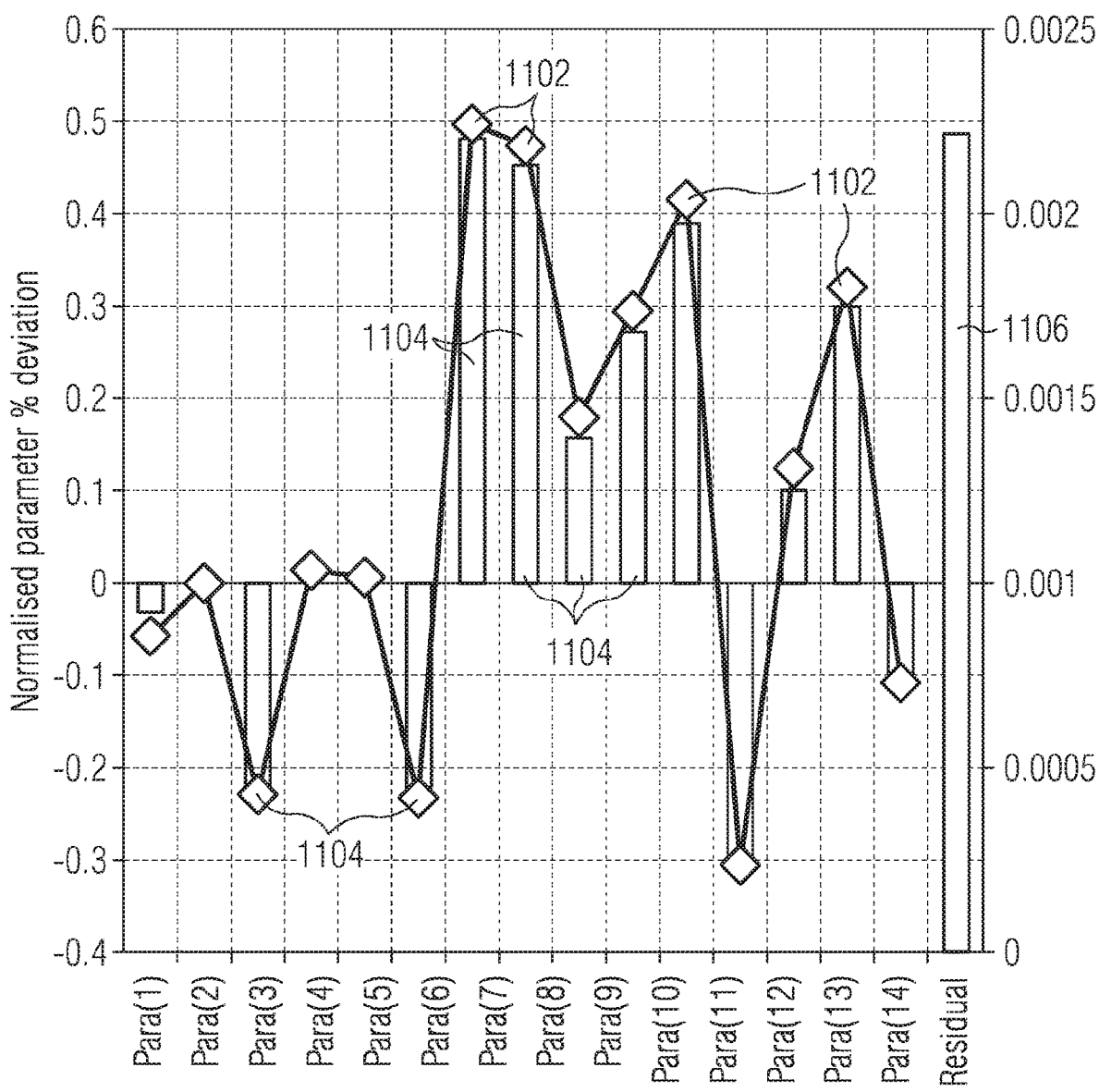
FIG. 11 shows an example of fault matching in accordance with an embodiment of the present invention.

The actual parameter values (measured and calculated) may also be presented (see e.g. FIG. 4) against the corresponding engine historical population data with the predicted fault scenario (see e.g. FIG. 11). The graphical presentation of FIG. 4 may also provide another level of guidance for a possibility and acceptance of a fault through visual logic. FIG. 5 shows another representation of the data in FIG. 4 indicating the probability of occurrence (shaded area).

Figure 6:
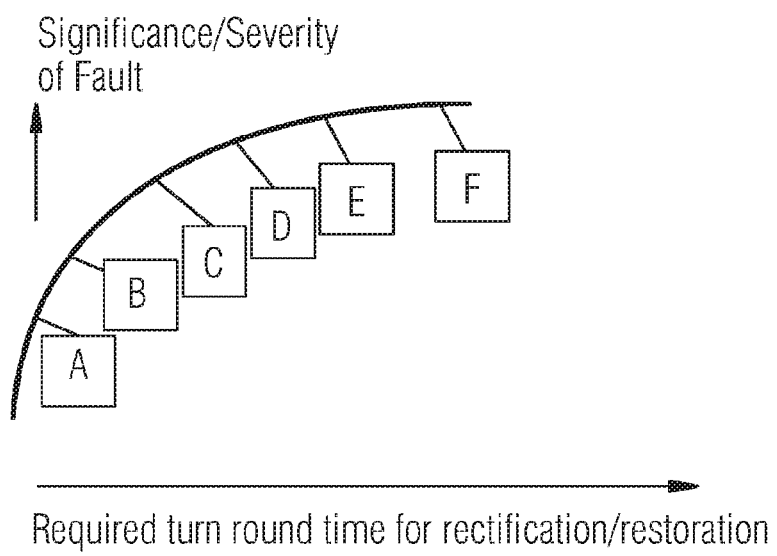
FIG. 6 shows significance of a fault in relation to time needed for rectification in accordance with an embodiment of the present invention.

If a fault is found, it goes through a significance and severity check, as shown in FIG. 6, to avoid fuel wastage, delays, etc. The categories shown in FIG. 6 are as follows:

A: The fault is mainly an instrument type issue and can be rectified by a test engineer.

B: More clarity is needed from a 100% load test. Continue to 75% load test and use multi-operating point analysis (feature that could be easily added analogous to 100% analysis) to improve clarity.

C: Seek advice from an expert (aided by stage 2, offline diagnostics, as described below).

D: Complete test in accordance with expert advice.

E: Discontinue test as data is of no use.

F: Discontinue immediately—not safe for operation.

For example, an instrument fault is not normally considered to be severe enough to discontinue a test performed during night shift. In most cases, the identified faults are corrected and the testing is then continued. An engine should be stopped for any other fault scenario and possibly the test should be discontinued for any faults presented with large change. These need to be clearly investigated, possibly offline by an expert. Ultimately, this might lead to engine being taken out of the test bed and stripped in order to rectify.

1.2 Double Fault Matching

Double faults by definition are combinations of instruments and/or engine component faults. Real engine faults, fouling, erosion, FOD (Foreign Object Damage) of compressor and turbine appear as combinations of changes in fundamental component health parameters (e.g efficiency, capacity etc.). Experience suggests that instrument faults are also highly likely during production engine test run, as they can either be slave or contract instruments that are not permanently fixed or completely dedicated to the test bed.

Assume that there is a number of n fault signatures/vectors (F(i)). Hence, there are $\Sigma(n-1)$ possible double fault combinations. The faults could also be combined together in different ratios, causing a vast number of possible combinations. All double fault combinations, incorporating two fault signatures are added together in a particular ratio:

$$F(total)=p*F(i)+r*F(j)$$

First, the vector formed by this combination is matched against the actual engine data deviations from the population mean. Considering that all fault free engines that sits within the population (e.g. $X(ave)+/-2*f*Std\_Dev$) are acceptable. The residuals are further reduced by performing a procedure similar to the 2nd iteration described above.

1.3 Fault Identification

Real faults, such as fouling, erosion, thermal distortion, FOD, etc. in an engine component, are presented themselves as combinations (in varying ratios) of changes in component health parameters. For example, the compressor fouling can be present in various degrees in a specific domain of compressor efficiency and capacity (coordinate/vector) space. Therefore, graphical 2D unit vector fault classification wheels (see FIG. 9) are formed with historical experience and published information for engine components in order to provide further definition to the cause for the fault, as follows.

Assume that the unit vectors of efficiency and capacity of an engine component are e and c, respectively, and that the respective magnitudes of change of these health parameters due to a fault are ME and MC. Hence, the vector representing this fault (F) can be written as:

$$F=ME*e+MC*c$$

The unit vector of this fault (Fu) is:

$$Fu = \frac{ME*e + MC*c}{\sqrt{ME^2 + MC^2}}$$

Once the fault is isolated to a component, the classification wheel and the vector Fu is used to provide possible cause/identification of the fault.

2. Offline Diagnostics (Stage 2)

Further diagnosis may be performed to clear any doubts, prior to engine strip to avoid unnecessary labour wastage etc. This is done in conjunction with bed, engine external checks and any measurement fault verification (that was presented in stage 1 above). Further checks are also performed to establish whether the fault is long term, such as a design change. This stage is normally performed by an expert and comprises the following:

1) Revisit the test data and redo stage 1 analysis offline through the eyes of an expert (e.g. to confirm the online findings from stage 1).

2) A rolling CuSum calculation would confirm whether, faults identified in stage 1 are long term step changes/faults.

3) Further evaluation and interrogation of engine population data. Performing multi-handle/operating point diagnostics/analysis (e.g. 75% load, fixing/rating data against different parameters) of the production engine test, may also be considered.

2.1 Rolling CuSum Calculations (computational version for recursive, automated calculation)

The k-th CuSum of a parameter X is $$S(k)=\sum_{n=1}^{k}[X(n)-\mu] \quad (1)$$

where $\mu$ is set to a predetermined fixed value, such as designed average etc., and k (e.g. timeline representation of number of engine) is counted from a predetermined point or since the last change.

$$\text{Furthermore}, S'(k)=G*k+A+V(k) \quad (2)$$

This is the linearized CuSum plot, when there is no step change (obtained from first few engines since last change), where S'(k) is the expected value of S(k) from the linearized trend.

Here, G and A are the gradient and intercept of S'(k) vs k plot and V(k) is the white noise associated with random variability (e.g. engine component parameter X(k)).

G and A are calculated from the last few points since last change (e.g. 4 points).

NOTE: the parameter $\mu$ in eq. 1 above may be selected as the mean last few engines (e.g. 4 points) since last change. In this case G=0 and A=0.

$$S'(k+1)=G*(k+1)+A+V(k+1) \quad (3)$$

$$\text{Therefore}, S'(k+1)-G*(k+1)-A=V(k+1) \quad (4)$$

However, if there is a change, [C(k+1)] at (k+1), this would be shown as a deviation between the expected/predicted S'(k+1) given by eq. 2 and the actual S(k+1). Then, the above equation 3 can be rewritten as:

$$S(k+1)-G*(k+1)-A=V(k+1)+C(k+1) \quad (5)$$

Figure 7:
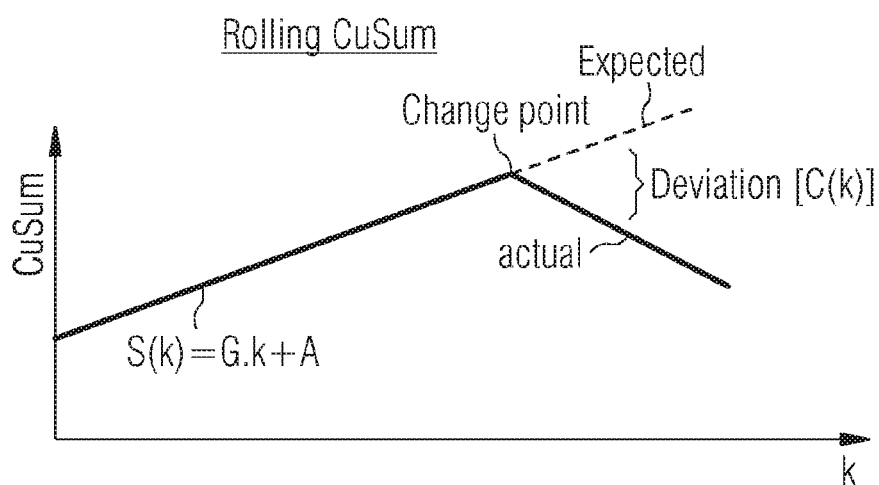
FIG. 7 shows an illustrating of a rolling CuSum in accordance with an embodiment of the invention.

In equation 5 above, S(k+1), the actual CuSum, is calculated from actual data using the above equation 1 (FIG. 7 shows an example of such a CuSum-calculation).

Hence, if the change C is not significant, S(k+1)−G*(k+1)−A equates to the random variability associated with V components, hence approximated to a mean of zero. The maximum magnitude of these components, based on addition of random variability components and 95% confidence, can be taken as 2*StdDev(X), hence the change C(k+1) to be significant C*(k+1)>2f*σ. The value/factor f is a variable between 0 and 1, which is based on confidence levels and the criteria set for null hypotheses. However, if the change C is smaller, it could get lost between the random variability at the first occurrence of fault. However, since the magnitude of the change is additive, it would become more and more prominent (until gradient G and A are updated recursively) with next (k+2), (k+3) occurrences. Once the change is confirmed, the gradient is updated corresponding to the first few points after this latest change.

In the event of a long term fault, relevant info, such as date of initiation, details of fault, is stored in a database. Therefore, if the sample used for descriptive statistics in the next online diagnostics is inclusive of this date, then it is prepared/corrected to take this into account. Correcting the sample in use this way would improve detection of any other new fault and avoids a multi-fault scenario (inclusive of an already known fault), that is more difficult to predict.

Figure 8:
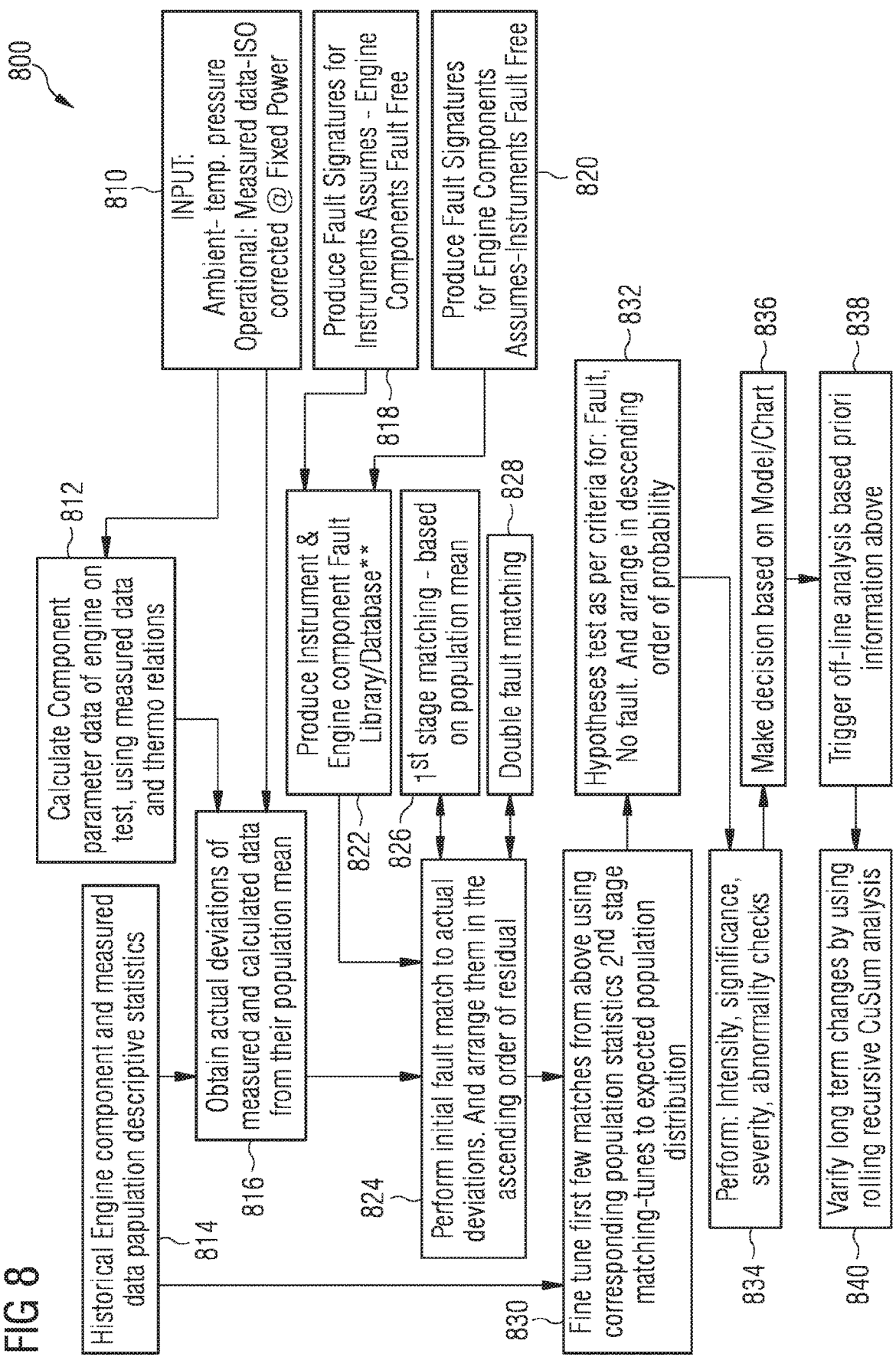
FIG. 8 shows a flowchart of a method according to an embodiment of the present invention.

FIG. 8 shows a flowchart of a method 800 according to the present invention as conceptually described above. More specifically, in step 810, ambient and operational values of parameters are obtained from sensors within or connected to the testing system (system sensors) and sensors of the turbine engine (turbine sensors) to be tested. In step 812, one or more component parameter values are calculated based on the parameter values from step 810 and known thermodynamic relations. In step 814, historical engine component and measured data population descriptive statistics corresponding to the test unit is obtained (e.g. from a database). Then, in step 816, actual deviations of measured and calculated data (measurement values and parameter values) are determined by comparison with the corresponding population mean. In step 818, a first set of fault signatures for instruments (e.g. sensors) is generated under the assumption that the engine components are fault free. In step 820, a second set of fault signatures is generated under the assumption that the instruments are fault free. In step 822, the first and second set of fault signatures are used to produce an instrument and engine component fault library or database. This library consists of pre-calculated sets of fault signatures for each engine rating and may be accessed whenever required during the diagnosis process. In step 824, an initial matching between fault signatures and actual deviations is performed, including a first stage (single fault) matching in step 826 and a double fault matching in step 828. The matching faults are arranged in the order of ascending residual. Then, in step 830, the first few matching faults are fine-tuned using corresponding population statistics (cf. step 814). This involves a second stage matching in order to tune to an expected population distribution. In step 832, a series of corresponding hypothesises (e.g. fault or no fault) are tested and the results are arranged in descending order of probability. In step 834, various checks are applied, such as intensity, significance, severity and abnormality checks. In step 836, a decision is made based on a model and/or a chart. Then, depending on the decision and identified fault(s), an offline analysis is triggered in step 838, which may further include verification of long term changes by applying rolling recursive CuSum analysis in step 840.

Figure 9:
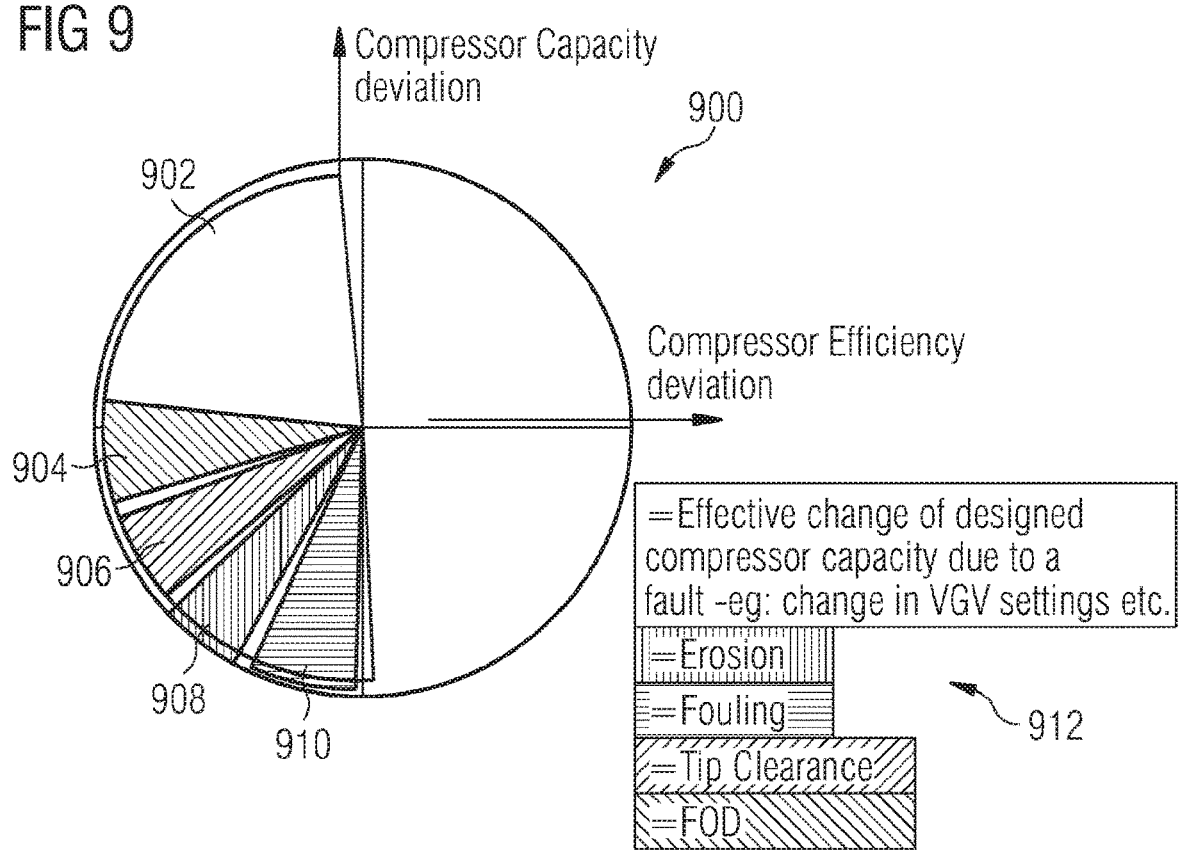
FIG. 9 shows a graphical representation of a compressor fault classification unit vector wheel in accordance with an embodiment of the present invention.

FIG. 9 shows a compressor fault classification unit vector wheel 900 generated for display to a user (e.g. a test engineer) during performance of a method according to an embodiment of the present invention. Wheel areas 902, 904, 906, 908, and 910 respectively correspond to faults caused by or related to changes of compressor capacity, FOD, tip clearance, erosion, and fouling (as also indicated by legend 912).

Figure 10:
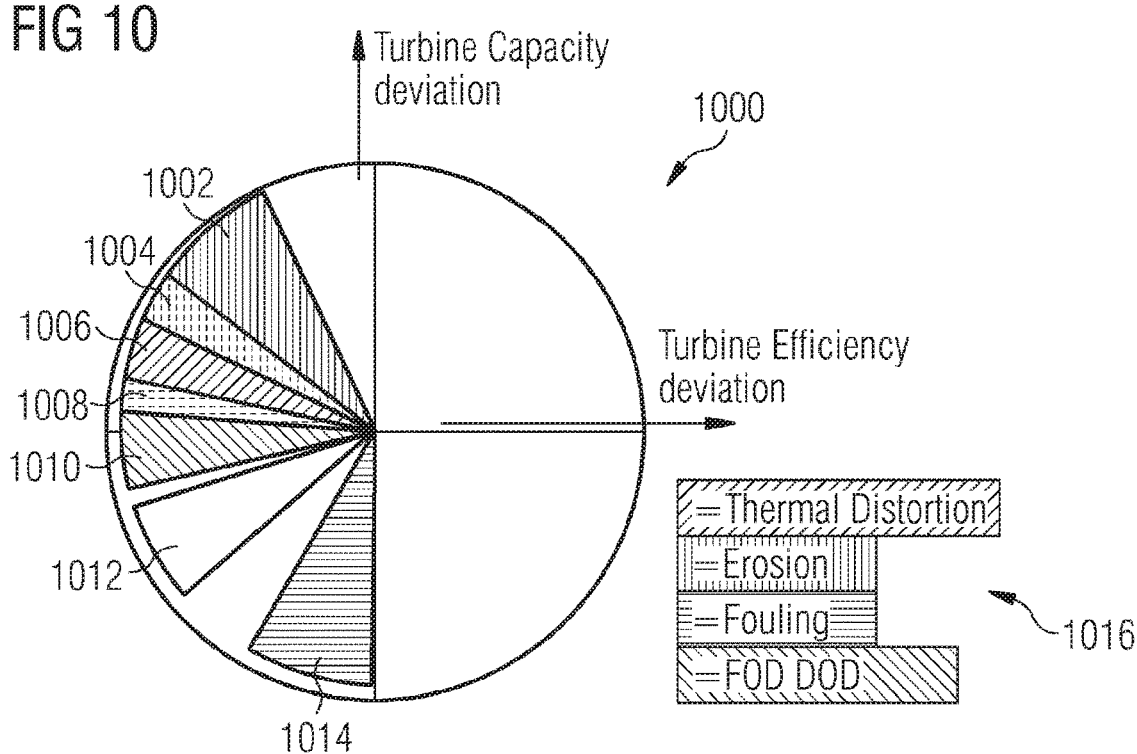
FIG. 10 shows a graphical representation of a turbine fault classification unit vector wheel in accordance with an embodiment of the present invention.

Similarly, FIG. 10 shows a turbine fault classification unit vector wheel 1000 generated for display to a user (e.g. a test engineer) during performance of a method according to an embodiment of the present invention. Here, wheel areas 1002, 1004, 1006, 1008, 1010, 1012, and 1014 respectively correspond to faults caused by or related to e.g. thermal distortion, erosion, fouling and FOD/DOD (as also indicated by legend 1016).

FIG. 11 shows an example of a double fault match detected in accordance with an embodiment of the present invention. The actual deviations are estimated against the current engine population statistics. This deviation, represented by tilted squares 1102, is matched to a (double) fault with a signature represented by bars 1104. The bar 1106 represents the corresponding residual. In the example shown in FIG. 11, the signature 1104 corresponds to a double fault consisting of a fault in instrument no. 3 and engine component parameter no. 6 with respective magnitudes of −0.65% and 1.33%.

The methods described above are computationally less demanding and easier to implement than known methods. The level of sophistication/accuracy is well pitched to the objective of the defined stages, and to the capabilities (uncertainties etc.) of instruments. It incorporates a fully automated online option, to provide better, faster incite to a situation especially when making decisions without expert knowledge (e.g. during night shift).

Summarizing, the methods according embodiments of the present invention comprises the following:

1). Simultaneous analysis of engine components and instruments is based on the concept that engine with fault free engine components can be sensors (observers) for instrument fault(s) while fault free instruments are sensors (observers) to detect engine components faults.

2). This simultaneous analysis and diagnosis of component and instrument faults also prevents that one fault type (e.g. component fault) corrupts the input data used for the other type (e.g. instrument fault) or vice versa, which would cause incorrect diagnoses.

3). The fault signatures of engine components, based on measured data, are obtained using a performance deck model. The fault signatures of instruments, based on engine component parameters are obtained using energy balance thermodynamic relations in the gas path used during testing. These relationships are slightly different to model, although they should give the same or corresponding final answers/solutions. The analytical redundancy formed due to these differences is beneficial to diagnostics. This would give an extra element of variability/uniqueness between fault signatures, when there is a fault, hence enhances the diagnostic quality and fault isolation.

4). The actual engine deviations are obtained by constraining the "FAULT FREE" engine to a range of +/−f*2.StdDev within current corresponding populations, where the factor f is gradually increased (but <1, to avoid less than 5% occurrence) until the residual R has been reduced to a certain given value. When this point has been reached, the corresponding factor f is the related probability of occurrence of that fault. For example, f=approx. 1=>5% occurrence or f=0.5=>30% or f=0.25=>70% occurrence. These probabilities of occurrences are only qualitatively, statistically accurate, but they are good indicators for weighing a probability of occurrence.

5). The diagnostic methods presented for the first stage (online diagnostics) is not mathematically an inverse problem anymore. Hence, it improves robustness (i.e. it is not prone to convergence issues). Furthermore, it can manage and still could provide useful info even when numbers of measurements are smaller than estimating engine health parameters.

6). The problem is broken down to stage by stage module analysis, pitched to the objective of one process stage at a time. a). During testing: To assess the quality of data and engine and rectification on the fly. b). Post testing: Confirmation for above and assess further, severity of "abnormality"—to aid borescope inspection and engine strip and rectification. This step by step, module analysis approach (analogous to iterative steps), corresponding to objective of the process stage, improves robustness, effectiveness and stability in convergence.

7). Rolling recursive type CuSum method is used to detect long term changes. When these long term changes are identified, the engine samples and descriptive statistics used in future diagnostics are then adjusted accordingly.

8). Double faults consisting of faults in instruments and/or engine components, are highly likely scenarios in a production engine test run. The methods according to the present invention easily accommodate these situations as the fault vectors are additive. The fault classification wheels would aid identification. These classifications are developed through experience, expert knowledge and published information. Hence, the fault identifications classified by the wheel would evolve and grow with time as and when more information become available.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. A method of fault diagnosis comprising:
testing a turbine engine unit in a turbine testing system, wherein the turbine engine unit comprises a plurality of turbine engine components and turbine sensors, and the turbine testing system comprises a plurality of testing sensors;
obtaining measurement data from the turbine sensors and the testing sensors, calculating at least one parameter value based on a thermodynamic relation applied to at least a portion of the measurement data[1], determining a deviation of the measurement data by comparing the measurement data with predetermined first reference data for the measurement data, and determining a deviation of the at least one parameter value by comparing the at least one parameter value with predetermined second reference data[2] for the at least one parameter value, and matching at least one of the determined deviation of the measurement data and the determined deviation of the at least one parameter value to at least one of a plurality of predetermined fault signatures to detect at least one fault, wherein the plurality of predetermined fault signatures comprises a first set of fault signatures and a second set of fault signatures, the first set of fault signatures corresponding to at least one of turbine sensor faults and testing sensor faults and presumes fault-free turbine engine components, the second set of fault signatures corresponding to turbine engine component faults and presumes fault-free turbine sensors and fault-free testing sensors, wherein the matching of the at least one of the determined deviation of the measurement data and the determined deviation of the at least one parameter value is arranged to simultaneously identify[3] whether the at least one fault is likely caused by a defective engine component of the plurality of turbine engine components or whether the at least one fault is likely caused by a defective sensor of the plurality of testing sensors and the turbine sensors faults, wherein the matching arranged to simultaneously identify the likely cause of the at least one fault is based on a respective degree of matching[4] with the first set of fault signatures and with the second set of fault signatures.

2. The method according to claim 1, further comprising generating an ordered list of faults based on the degree of matching.

3. The method according to claim 1, wherein the matching of the at least one of the determined deviation of the measurement data and the determined deviation of the at least one parameter value to the at least one of the plurality of predetermined fault signatures comprises a single fault matching stage based on at least one of mean values of the first predetermined reference data and mean values of the second predetermined reference data.

4. The method according to claim 1, wherein the matching of the at least one of the determined deviation of the measurement data and the determined deviation of the at least one parameter value to the at least one of the plurality of predetermined fault signatures comprises a double fault matching stage based on: at least one of mean values of the first predetermined reference data and mean values of the second predetermined reference data; and weighted pairs of fault signatures.

5. The method according to claim 1, further comprising:
determining a probability of occurrence for a plurality of candidate faults and generating a list of the candidate faults in accordance with the determined probabilities.

6. The method according to claim 5, further comprising:
selecting at least one of the candidate faults as an occurring fault based on the list of candidate faults.

7. The method according to claim 1, further comprising:
outputting information identifying a fault and/or a corresponding source of fault.

8. The method according to claim 1, further comprising:
stopping the testing of the turbine engine unit, and based on the determined fault, determine whether the fault can be remedied by replacing one or more testing sensors.

9. A system for testing the turbine engine unit, the system comprising:
a test bed for receiving the turbine engine unit to be tested, and
a controller coupled to receive the measurement data from the turbine sensors and the testing sensors, the controller adapted to control a test operation of the turbine engine unit,
wherein the controller is further adapted to perform fault diagnosis during the test operation by using the method according to claim 1.

10. A computer comprising:
computer executable instructions stored on a non-transitory computer readable medium, which, when performed by a processor of the computer, are adapted to cause the computer to perform the method according to claim 1.

11. A non-transitory computer readable data carrier loaded with a computer program adapted to perform the method according to claim 1 when executed by a processor.

* * * * *